Figure 1:
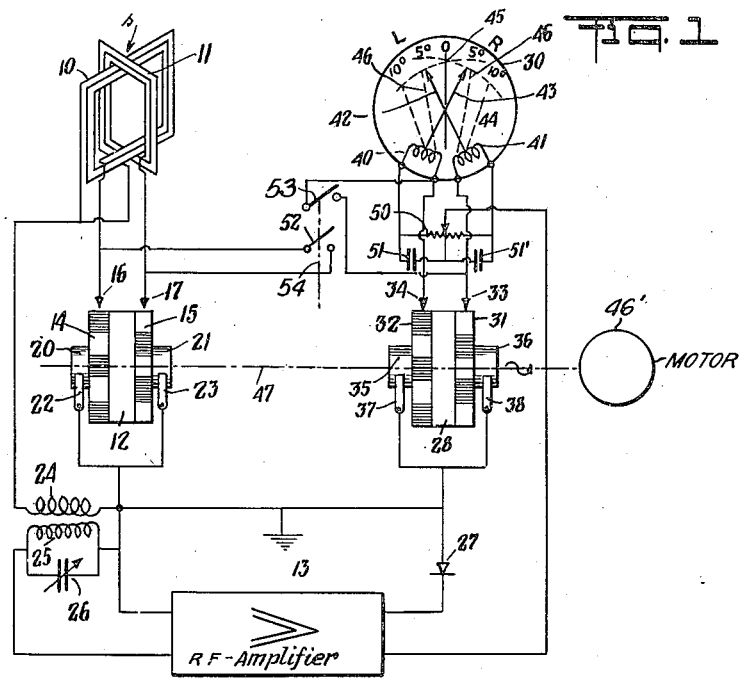

March 1, 1949.    F. A. KOLSTER    2,463,286
RADIO DIRECTION FINDING SYSTEM
Filed April 1, 1944    3 Sheets-Sheet 1

INVENTOR.
Frederick A. Kolster
BY
ATTORNEY

INVENTOR.
Frederick A. Kolster
BY

ATTORNEY

Patented Mar. 1, 1949

2,463,286

UNITED STATES PATENT OFFICE 2,463,286

RADIO DIRECTION FINDING SYSTEM

Frederick A. Kolster, New York, N. Y.

Application April 1, 1944, Serial No. 529,054

11 Claims. (Cl. 343—120)

1

My invention relates to a system for and method of radio direction finding, such as used on aircraft, ships and other moving vehicles as well as on land stations for navigation purposes.

More particularly, the invention relates to improved means, whereby radio signals radiated by a transmitting system are caused to provide a visible indication at a receiving station showing the direction from which said signals are arriving.

Direction finding systems heretofore known, especially those designed to enable a direct indication of the direction of travel of a radio wave in angular degrees from a given direction or course and radio direction systems operating like a compass designed to provide a directional indication over a full 360° angle, have become very complicated mechanically as well as electrically and generally, for these reasons, are not entirely satisfactory and suitable for numerous purposes and particularly not adapted to quantity production and use by less trained and skilled personnel.

Accordingly, an object of my invention is to provide a radio direction finding system of this character which is both simple to manufacture and easy to operate and to maintain without in any way impairing its accuracy and general operating performance.

One known type of direction finding system of the above character, for determining the direction of travel of an electromagnetic wave comprises two separate and similar directional antennae having "figure of eight" directional patterns arranged with their axes forming predetermined angles with each other and connected by way of identical and balanced amplifiers to a ratio indicator calibrated directly in degrees of angular deviation with respect to a predetermined reference line, such as a bisecting line between the antenna axes. Arrangements of this type, in order to be accurate and reliable, require careful balancing of the gains of the amplifiers and calibration during manufacture as well as constant re-checking and control of the balance during operation. For these reasons, other direction finding systems have become known which use a single amplifier feeding a single indicator and switched alternately to one of a pair of directional antennae or to a directional and non-directional antenna. Systems of the latter type, however, are not suitable to indicate direction or angular deviation in degrees from a given course and practically are able to afford merely a left-right or so-called homing direction finding indication in enabling

2 a craft to travel only the direct course toward or away from a radio transmitting station.

Accordingly, a more specific object of my invention is to provide a radio direction finding system which, while simple in design and using a single amplifier, enables the indication of both a given direction with respect to a radio transmitter as well as of the deviation from said direction in terms of angular degrees in a simple and reliable manner and substantially without special attendance and maintenance on the part of the operator.

Another object is to provide a direction finding system of this type operative in any of the four quadrants or any desired direction with respect to a given transmitting station or in other words enabling a bearing indication within a full 360° compass scale.

Figure 2:
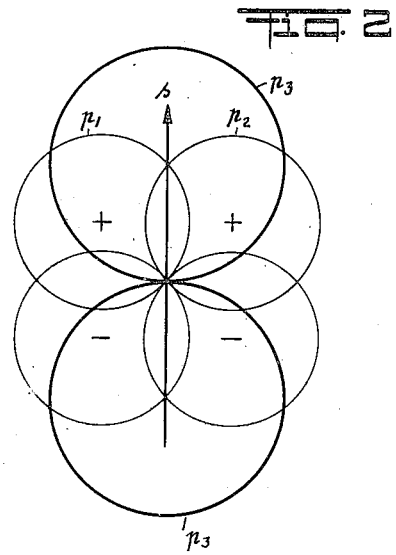
Figure 3:
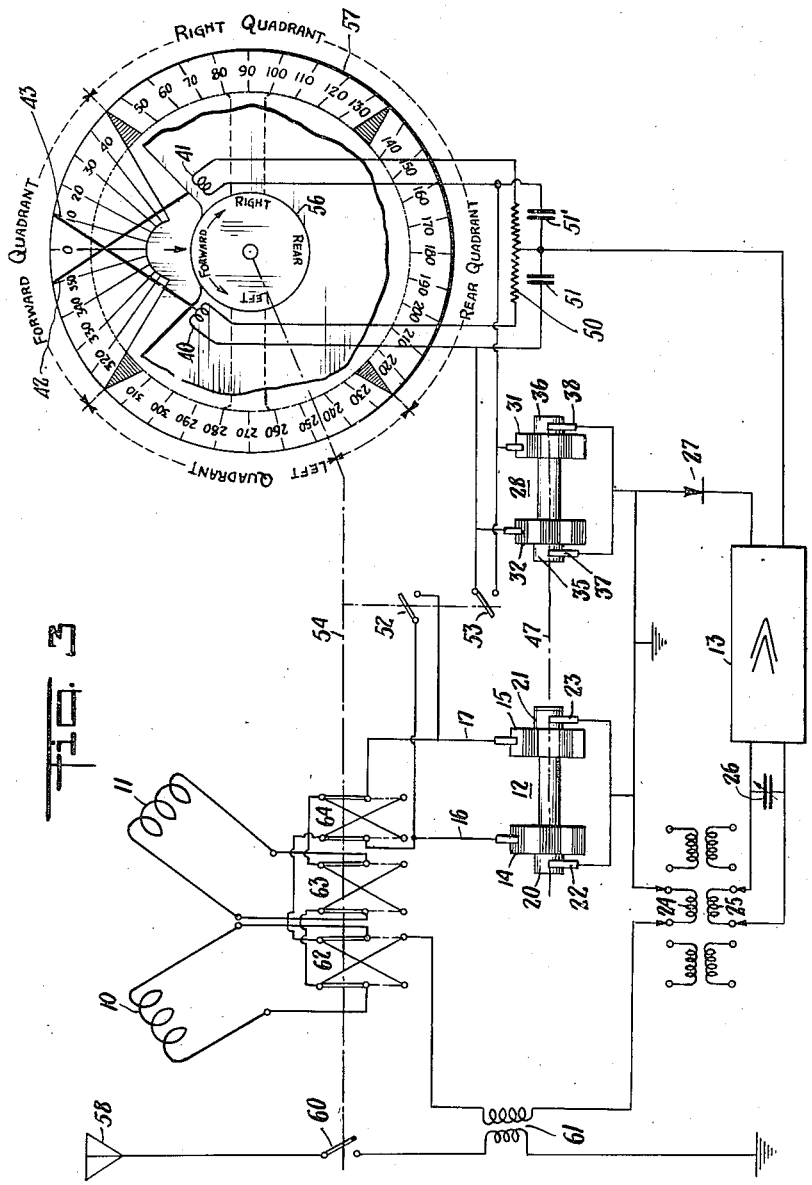
Figures 8, 9:
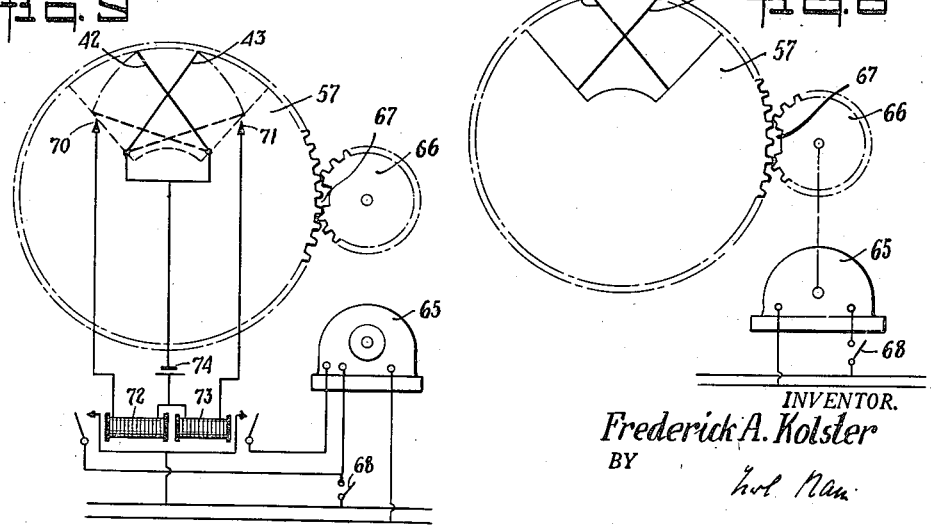

The above and further objects and novel aspects of my invention will become more apparent from the following detailed description taken in reference to the accompanying drawings forming part of this specification, and wherein:

Figure 1 is a schematic circuit diagram of a radio direction finding system embodying the principles of the invention, Figure 2 is a polar diagram explanatory of the function and mode of operation of the invention, Figure 3 shows a direction finding system similar to Figure 1 embodying an indicating scale and other features of improvement to enable a bearing indication in any direction within all four quadrants in respect to a given transmitting station, Figures 4 to 7 are diagrams showing the scale position and illustrating the switching operations necessary when changing between the various quadrants in a system according to Figure 3, and, Figures 8 and 9 are fragmentary views illustrating additional features of improvement and modifications of a direction finding system of the type shown in Figure 3.

Like reference characters identify like parts throughout the different views of the drawings.

Referring more particularly to Figure 1, I have shown a pair of directional antennae in the form of two orthogonal loop aerials 10 and 11 arranged one with respect to the other in such a manner that two intersecting directional polar patterns $p_1$ and $p_2$ are provided symmetrically disposed about a zero or center line $s$ as shown in Figure 2. The loops may be spaced at a desired distance or may be coaxial as shown and the including angle may be other than 90° to suit existing conditions and requirements. They are advantageously electrostatically shielded in a manner known and well understood by those skilled in the art so as to be responsive to the electromagnetic component only of an incoming radio wave and to eliminate undesirable electrostatic couplings and disturbances. In place of loops, any other type of directional aerials having "figure of eight" type or other overlapping receiving patterns may be provided, such as a pair of dipoles, and the design and construction of the aerials may be such that patterns of different shape, such as a pair of overlapping cardioids or the like are obtained by combination with a suitable open or non-directional antenna, reflecting devices and other means well known in the art.

I have furthermore shown in Figure 1 a first switching device in the form of a rotating commutator 12 for alternately applying the energies collected by the loops 10 and 11 to the input of a single high gain radio frequency amplifier 13 of well known design. For this purpose, the switching device 12 in the example shown, has a pair of commutating members 14 and 15 each comprising alternate conducting and insulating elements and a pair of sliding contacts or brushes 16 and 17 cooperating therewith in the manner indicated and well understood. The conducting elements of each commutating member are electrically connected to a slip ring 20 and 21 or the like upon which slide the further contacts or brushes 22 and 23, respectively.

The loops 10 and 11 are connected in series, with the open terminals being each connected to one of the sliding contacts 16 and 17 and the common junction point of the loops being connected to both the brushes 22 and 23 by way of the primary winding 24 of a single tuned radio frequency input transformer. The secondary winding 25 of the transformer which serves as a coupling means between the loops and the amplifier 13 is tuned to the frequency of the signal to be received by the aid of a variable condenser 26 to provide a single coupled tuned circuit common to both receiving loops. This coupling transformer is of a special design to give maximum receiving efficiency and selectivity.

The use of a single tuned circuit 25—26 for both loop aerials has a decided advantage over systems requiring separate tuning means which have to be carefully balanced and adjusted in unison by a common control member. Such a balance of two tuned circuits at radio frequency has presented considerable and often unsurmountable difficulties in the past due to unavoidable coupling and inter-action as well as phasing problems and other difficulties. The present invention completely avoids this and makes it possible to employ adequate amplification of the radio frequency signals by means of a standard high frequency amplifier.

The single high gain linear amplifier 13 which may be a straight R. F. amplifier or preferably a superheterodyne amplifier of well known construction, is designed to provide sufficient rectified output current by the diode or other linear detector 27 to operate a twin indicator or crosspointer meter 30 the two pointers of which have their own magnet or moving coils arranged to be switched to the output of the amplifier synchronously with the switching of the loop potentials so that, in effect, each collector or loop has its own individual indicator instrument, the pointers of which are so arranged as to cooperate to produce a single indication, ascertainable by a single observation, of the bearing or direction of the received radio wave.

The output switching device 28 shown for this purpose is substantially similar to the input switching device 12, comprising a pair of commutator members 31 and 32, each having alternate conducting and insulating elements, sliding contacts or brushes 33 and 34, slip rings 35 and 36 and cooperating brushes 37 and 38, respectively. The twin indicator 30 shown schematically comprises a pair of moving coils 40 and 41 mounted in a known manner between permanent magnet poles and each carrying a pointer 42 and 43, respectively, said pointers being arranged to move in opposite directions over a common dial or chart 44 provided with a center or unity ratio line 45 and adjacent ratio lines 46 to be described in more detail presently. Both switching or commutating devices 12 and 28 are driven in synchronism by a suitable prime mover, such as an electric motor 46' and for this purpose are shown mounted upon a common shaft indicated at 47. As is understood, the conducting and insulating elements of the commutator members in each switching device are properly displaced with respect to each other for alternately switching each of the loops to one of the units of the twin indicator 30 by way of the receiver comprising the amplifier 13 and rectifier 27. The indicator 30 may consist of two separate units each having its own magnet structure and mounted in a common casing. Alternatively, both indicators may have a common permanent magnet provided with a pair of air gaps for receiving the moving coils 40 and 41 as is customary in the construction of known types of cross-pointer meters.

The electrical connections between the output of the amplifier 13 and rectifier 27 on the one hand and the twin indicator 30 on the other hand through switching device 28 are similar to the connections between the loops 10 and 11, the input switching device 12 and the input of the amplifier 13. In the example shown, one of the output terminals of the amplifier and rectifier is connected to both brushes 37 and 38, while the other output terminal is connected to the adjustable center tap of a load resistance or potential divider 50 having its sections shunted by smoothing condensers 51 and 51' to eliminate both the radio frequency component and any audio frequency or modulation from the currents applied to the indicator units, or in other words to energize the latter by currents proportional to the respective carrier amplitudes of the signals received by the loops 10 and 11, the ratio of which bears a direct relation to the direction of travel of the wave energy being received. Furthermore, one terminal of each of the indicators is connected to one of the sliding contacts 33 and 34, while the remaining terminals are each connected to one of the outer ends of the load resistance 50, to complete the electrical circuits for alternately applying the rectified output voltage of the amplifier to the indicator moving coils 40 and 41.

There is thus provided by the invention a radio direction finding system wherein the signal energies collected by each of a pair of directional aerials having overlapping receiving patterns symmetrically displaced about a center line, are alternately applied to the input of a single tuned high gain radio frequency amplifier and utilized upon amplification and rectification to energize a pair of substantially electrically isolated indicators by the rectified carrier frequency amplitudes, said indicators being physically arranged to have their pointers cooperate to provide a single indication ascertainable by a single observation of the ratio between the signal energies collected by said aerials which ratio bears a direct relation to the direction of travel of the signals being received. The switching frequency is chosen at an appropriately high rate to cause the pointers 42 and 43 to assume a substantially steady position free from the mechanical inertia of the pointer movements. The function and operation of the invention is further understood from the following.

Referring to Figure 1, if a radio wave arrives in the direction of the bi-secting line s, between the loops 10 and 11, the energies collected by the loops will be equal as follows from the polar diagram of Figure 2 and accordingly, the pointers 42 and 43 will be equally deflected in such a manner that their intersection point travels up and down the center line 45 depending on the strength of the received signal, indicating thereby to the operator that the transmitting station is in the direction of the bi-secting line s. The latter may advantageously coincide with the keel or center line of a ship or other moving vehicle or correspond to true north and south if the direction finder is used on the ground in fixed position. If desired, the receiver 13 may include an automatic volume control arrangement to prevent excessive variation of the output energies and too rapid movement of the pointer intersection when approaching a transmitting station and to enable the system to operate over substantial distances without the use of attenuators and other auxiliary devices.

If the course of the vehicle deviates from the above true course towards or away from a radio station, the pointers 42 and 43 will be deflected over different angles so that the common intersection point will move to the left L or right R and coincide with a different ratio line 46 calibrated in degrees of angular deviation from zero deviation or the true course represented by the unity ratio or center line 45.

In order to resolve the 180° ambiguity, i. e. to determine whether a signal arrives in the fore or aft direction or in other words whether a craft is approaching or receding from a radio station, any one of the means and methods known in the art may be used in connection with the invention, such as by temporarily combining the energy of either or both loops with the energy received by a non-directional or open antenna to change from a "figure of eight" pattern to a uni-lateral or cardioid-like pattern.

The switches 52 and 53 suitably arranged for uni-control by means of a common operating member indicated schematically at 54 are for the purpose of short circuiting the switching devices 12 and 28 and thus connecting the loops or other collectors 10 and 11 in parallel and likewise the indicating units or moving coils 40 and 41. In this manner, the system will operate as a single (phantom) loop direction finder as shown by the "figure of eight" pattern $p_3$ in Figure 3 for either maximum or null method of bearing indication. In other words, with the switches 52 and 53 closed, the bearing indication will be given by a maximum amplitude of the indicating pointers or common intersection point thereof along the vertical zero line 45 and the 90° and 270° ambiguity may be resolved by observing the complete collapse of the pointers along the zero line as follows clearly from pattern $p_3$ in Figure 2.

It will be furthermore understood that any system of antennae or wave collectors capable of producing intersecting or overlapping directional patterns symmetrically disposed about a zero or center line may be used in connection with the invention. Thus in the case of ultra high frequencies, di-poles or antennae arrays arranged to produce sharply defining intersecting or overlapping directional patterns may be employed together with the switching and cross-pointer indicating system or equivalent arrangement described hereinabove.

The arrangement shown in Figure 1 is normally operative within a single quadrant only, that is, for transmitting stations located within the forward or rear quadrant. In order to determine in which of the quadrants a station is located or to resolve the 180° ambiguity, a suitable non-directional or sense antenna may be temporarily connected to the receiver and one, or both loops in the manner mentioned, whereby to change the "figure of eight" pattern into a cardioid shaped pattern in a manner well known in the art.

As is understood, the angle between the loops for the forward and rear quadrants may be less than 90° to increase the angular sensitivity if a lesser total angular deviation or indicating range is sufficient. In this respect the invention has the advantage that the loops need not be decoupled since only one of the loops is operative at any time in exciting the receiver and its associated indicating instrument.

According to a further feature of the invention, a bearing indication over a full 360° compass scale is enabled by the provision of a rotatable dial or chart associated with a suitable switching mechanism for connecting a sense antenna and changing the polarization of the loop potentials when passing from one to the next quadrant in the manner described in detail in the following. Such an arrangement as shown schematically in Figure 3 makes it possible for a movable craft to determine its direction with respect to a fixed station or for a fixed station to determine the direction of a movable craft without being limited to any specific quadrant, such as the forward or rear quadrants when using a system according to Figure 1 described hereinbefore.

For this purpose I have shown in Figure 3 a quadrant selector knob 56 carrying a chart disc or dial 57 provided with a full 360° scale and normally arrested or locked in position by means of a spring or the like. By unlocking the control knob 56 such as by a slight pressure thereon, the commutators 12 and 28 will be short circuited in the manner described hereinbefore by the switches 52 and 53 suitably mechanically coupled with the knob 56 as indicated by the dot-dash line 54. At the same time, a non-directional or sense antenna 58 is connected in series with the loops 10 and 11. The circuit of the antenna 58 for this purpose includes a further switch 60 also mechanically coupled through the coupling connection 54 with the selector knob 56. The antenna circuit also includes the primary of a coupling transformer 61 having its secondary connected in series with the loops and the input of the receiver 13.

In this manner, by the pressing and unlocking of knob 56, the loops 10 and 11 are combined to produce a single "figure of eight" pattern or phantom loop in the manner described and shown at P3 in Figure 2, which together with the antenna 58 results in a uni-lateral substantially cardioid shaped pattern which may be switched to any of the four quadrantal positions by rotation of the knob 56 and proper change of the polarization of the loop potentials by means of a pair of reversing switches 62 and 63 when passing from one to the next quadrant. The proper quadrant in which the transmitting station received is located is ascertained by observing maximum deflection of the intersection of the pointers 42 and 43 on the 0°, 90°, 180°, and 270° lines, respectively, on the chart or dial 57. Release of the knob 56, after the proper quadrant has been ascertained, and arresting or locking of the disc 57 will then restore the original operating condition of separate alternate reception and indication of the loop potentials to enable a true bearing indication in angular degrees from the particular quadrantal direction indicated within the forward, rear, left and right quadrants in which the transmitter is located.

The mechanical design and construction of the switch mechanism for operating the short circuit switches 52 and 53 and the antenna switch 60 by the pressing and release of knob 56 and for operating the reversing switches 62 and 63 by the rotation of the knob 56 or disc 57 will be self-evident to those skilled in the art and has not been shown in detail in the drawing. The reversal of the loop potentials when passing from one to the next quadrant by the switches 62 and 63 will be further understood by reference to Figures 4 to 7 which illustrate schematically the conditions for the forward, rear, right and left quadrants, respectively.

The indicators or position of the pointers are shown in Figures 4a, 5a, 6a and 7a, while the loops are shown in Figures 4b, 5b, 6b and 7b and are identified by the same numerals as the respective pointers. The sense or phase of the loop potentials is indicated by the corresponding arrows in the drawing. Figures 4c, 5c, 6c and 7c show the respective receiving patterns for the different quadrants. Thus, referring to Figure 4 relating to the forward quadrant, the combination of both loop potentials results in a "figure of eight" pattern $p_3$ as shown in Figure 4c cooperating with the circular pattern $p_4$ of the sense antenna 58 to produce a resultant cardioid shaped pattern $p_5$ pointing in the zero or forward direction. For the right quadrant as shown in Figure 5, one of the loop potentials has been reversed by the operation of one of the switches 62 and 63, resulting in a rotation of the cardioid $p_5$ to the right by 90°. For the rear quadrant, both loop potentials are reversed by operation of both switches 62 and 63 resulting in a further rotation of the cardioid pattern so as to point in the 180° direction with respect to the transmitting station. Finally, in the left quadrant, the reversal of the other loop potential results in a further 90° rotation of the cardioid as shown. By observing the maximum deflection of the pointer intersection on the respective 0°, 90°, 180° and 270° lines, the proper quadrant may be easily ascertained, whereupon the release of the knob 56 will restore the system to its normal operating condition for true bearing indication within the quadrant selected. In the example shown, the loops are assumed to be at right angle to each other, whereby to obtain equal angular sensitivity in all four quadrants.

In order to obtain an indicating scale reading consecutively from 0° to 360° as shown, it is furthermore necessary to interchange the indicators with respect to the loops 10 and 11 when passing from one to the next quadrant. For this purpose, there is shown a further reversing switch 64 arranged for operation simultaneously with the phase reversing switches 62 and 63 and mechanically connected with the adjusting knob 56 or dial disc 57. The position of switches 62, 63 and 64 shown in the drawing correspond to the forward quadrant as indicated by the position of the dial 57. When changing to the right quadrant, switch 63 is reversed as follows from Figure 5 to reverse the phase of the potential of loop 11 (corresponding to loop 2 in Figures 4 to 7). At the same time, switch 64 is reversed to obtain a correct reading of the right quadrant scale by the intersection of pointers 42 and 43.

For the rear quadrant, switches 62 and 63 and for the left quadrant switches 62 and 64 are reversed to obtain both the proper phasing of the loop potential and switching of the cardioid pattern into the proper direction as well as the proper bearing indication for the respective quadrantal scales in the manner readily understood from the foregoing.

In place of manual operation of the quadrant control, a motor driven scale and switch may be employed as indicated schematically in Figure 8. In the latter, the scale disc or dial 57 is driven by a motor 65 by way of a pinion 66 meshing with peripheral teeth of the disc and having a cut 67 to arrest the movement of the disc after each rotation through a 90° angle for a short period. The motor has a starting switch 68 suitably coupled with the sense antenna switch 60 and the commutator short circuiting switches 52 and 53.

Figure 4:
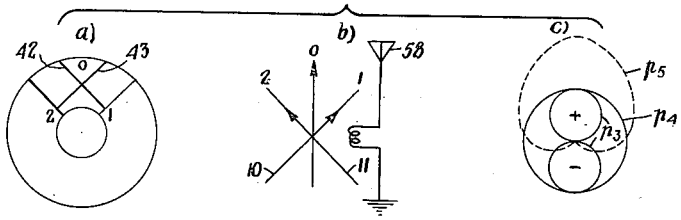
Figure 5:
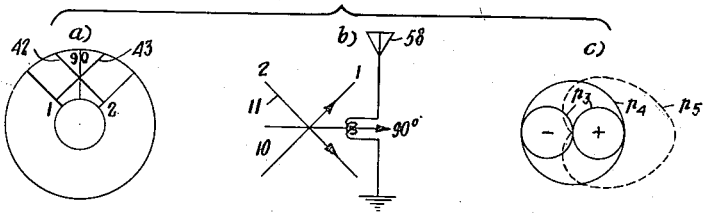
Figure 6:
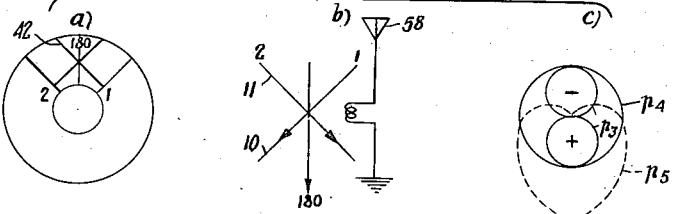
Figure 7:
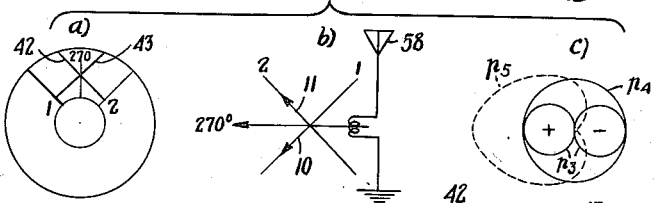

Thus, by closing switch 68 and starting the motor 65, a single cardioid shaped receiving pattern is produced in the manner described and shown e. g. in Figure 4c. As the motor drives the scale 57 and operates reversing switches 62, 63 and 64, the four quadrants of the indicator dial will appear at the meter opening in sequence, stopping for a short period at the 0°, 90°, 180° and 270° positions due to the cut 67, while switching from one to the next cardioid pattern as shown in Figures 4c to 7c. The quadrant which gives maximum deflection of the cross-pointer intersection is noted and the motor stopped in this position by releasing switch 68. This will also open the sense antenna switch 60 and the short circuiting switches 52 and 53 so that true bearing will now be indicated.

According to a further modification of the invention, additional facilities may be incorporated which will provide an automatic continuously operating bearing indication of a transmitting station once it has been located in the proper quadrant. This requires a closing of a further switch or contact by each of the meter pointers when either pointer reaches the 45° or no-current condition. An arrangement of this type is indicated schematically in Figure 9. In the latter, the pointers are shown to cooperate with contacts 70 and 71 when in the 45° or no-current position, said contacts being connected to suitable reversing terminals of the motor 65 by way of relays 72 and 73 energized by a battery 74. The arrangement and connections are such that when pointer 42 is down, contact 70 will start the motor 65 rotating in counterclockwise direction and when pointer 43 is down, contact 71 will start the motor to rotate in clockwise direction. The relays 72 and 73 may be of suitable construction to hold their armatures in attracted position upon energization by a current impulse caused by the pointers 70 and 71 closing their respective contacts. Thus, when passing a beacon or other transmitting station either to the left or the right, the true bearing will at all times be indicated automatically or the proper quadrant on the indicator scale adjusted to enable a full 360° direction indication.

The starting of the operating motor or the indicator dial by means of contacts in the 45° position of the pointers may be modified in various manners which will suggest themselves to those skilled in the art.

The indicator and dial 57 are advantageously mounted in a protective casing having an opening or window revealing only the operative quadrant of the dial in operative relation with the ratio indicator to the observer, in the manner indicated in Figure 3. The latter also shows the provision of a wave switch arrangement to enable the use of the direction finder within an extended range of transmitting wave lengths or operating frequencies.

It will be evident from the foregoing that my invention is not limited to the specific details, arrangement of parts and constructions shown and disclosed herein for illustration, but that the underlying principle and novel inventive thought are susceptible of numerous variations and modifications coming within the broader scope and spirit of the invention as defined by the appended claims. The specification and drawings are accordingly to be regarded in an illustrative rather than in a limiting sense.

I claim:

1. A radio direction finding system comprising a pair of directional antennae having "figure of eight" type directional patterns with their axes oriented at a right angle to each other, single radio receiving means for both said antennae comprising radio frequency amplifying and detecting means, a cross-pointer indicator comprising a pair of substantially electrically isolated indicator units responsive to the instantaneous amplitude of an applied current to be measured and having pointers crossing each other over a common dial provided with ratio lines, synchronous switching means for alternately connecting each of said aerials to one of said indicators through said receiving means, the switching frequency being of the order to produce a substantially steady pointer deflection free from the effects of the inertia of the pointer movements, and means for temporarily applying the combined energies simultaneously collected by both of said antennae to the input of said receiving means and applying equal portions of the output energy of said receiving means to said indicator units.

2. A radio direction finding system comprising a pair of directional antennae having "figure of eight" type directional patterns oriented with their axes at a right angle to each other, single radio receiving means for both said antennae comprising radio frequency amplifying and detecting means, a cross-pointer indicator comprising a pair of substantially electrically isolated indicator units responsive to the instantaneous amplitude of an applied current to be measured and having pointers crossing each other over a common dial provided with a plurality of ratio lines, synchronous switching means for alternately connecting each of said aerials to one of said indicators through said receiving means, the switching frequency being of the order to produce a substantially steady pointer deflection free from the effects of the inertia of the pointer movements, and means for temporarily connecting said antennae in parallel to apply the combined energies received thereby to the input of said receiving means and for applying equal portions of the output energy of said receiving means to said indicators.

3. A radio direction finding system comprising a pair of directional antennae having figure-of-eight type receiving patterns and oriented with their axes forming right angles with each other, common receiving means for said antennae comprising radio frequency amplifying and detecting means, a cross-pointer ratio meter comprising a pair of electrically isolated indicators having pointers crossing each other, synchronous switching means for alternately connecting each of said antennae to one of said indicators through said receiving means, a dial chart having quadrantal sections each provided with a series of ratio lines for cooperation with the intersection of said pointers to indicate the direction of travel of an electromagnetic wave received by said antennae within a given quadrant, quadrant selecting means for consecutively placing the quadrantal sections of said chart into cooperative relation with said meter, and means for ascertaining the quadrant in which said wave is received comprising an omni-directional antenna, switching means for combining the energies received by said directional and omni-directional antennae and for equally energizing said indicators by the combined energy, whereby to obtain a combined cardioid type receiving pattern, and further means for changing the relative polarity of the energies derived from said directional antennae upon passing from one to the next quadrantal position of said chart, whereby to displace the axis of said cardioid pattern to point in the direction of the quadrant selected.

4. A radio direction finding system comprising a pair of directional antennae having figure-of-eight type receiving patterns and oriented with their axes forming right angles with each other, common receiving means for said antennae comprising radio frequency amplifying and detecting means, a cross-pointer ratio meter comprising a pair of electrically isolated indicators having pointers crossing each other, synchronous switching means for alternately connecting each of said antennae to one of said indicators through said receiving means, a dial chart having quadrantal sections each provided with a series of ratio lines for cooperation with the intersection of said pointers to indicate the direction of travel of an electromagnetic wave received by said antennae within a given quadrant, quadrant selecting means for consecutively placing the quadrantal sections of said chart into cooperative relation with said meter, and means for ascertaining the quadrant in which said wave is received, comprising an omni-directional antenna, means for normally locking said chart, switch means operative upon unlocking said chart for combining the energies received by said directional antennae and said omni-directional antenna and for equally energizing said indicators by the combined energy, whereby to obtain a combined cardioid type receiving pattern, and further means for changing the relative polarity of the energies derived from said directional antennae upon passing from one to the next quadrantal position of said chart, whereby to displace the axis of said cardioid pattern to point in the direction of the quadrant selected.

5. A radio direction finding system comprising a pair of directional antennae having figure-of-eight type receiving patterns and oriented with their axes forming right angles with each other, common receiving means for said antennae comprising radio frequency amplifying and detecting means, a cross-pointer ratio meter comprising a pair of electrically isolated indicators having pointers crossing each other, synchronous switching means for alternately connecting each of said antennae to one of said indicators through said receiving means, a circular dial chart having quadrantal sections each provided with a series of ratio lines for cooperation with the intersection of said pointers to indicate the direction of travel of an electromagnetic wave received by said antennae within a given quadrant, quadrant selecting means for rotating said dial chart to consecutively place the quadrantal sections thereof into cooperative relation with said meter, means for ascertaining the quadrant in which said wave is received comprising an omni-directional antenna, switching means for combining the energies received by said directional antennae and said omni-directional antenna and for equally energizing said indicators by the combined energy, whereby to obtain a combined cardioid type receiving pattern, further means for changing the relative polarity of the energies derived from said directional antennae upon passing from one to the next quadrantal position of said chart, whereby to displace the axis of said cardioid pattern to point in the direction of the quadrant selected, and further means for interchanging the relative connection between said directional antennae and said indicators upon passing from one to the next quadrant of said chart to provide a consecutive 360° bearing indicating scale on said chart.

6. A radio direction finding system comprising a pair of directional antennae having figure-of-eight receiving patterns and oriented with their axes forming right angles with each other, receiving means for said antennae comprising radio frequency amplifying and detecting means, a ratio meter energized by the output of said receiving means and adapted to indicate the ratio of the energies received by said antennae from an electromagnetic wave, said ratio bearing a definite relation to the direction of travel of said wave within a given quadrant, a dial chart having quadrantal sections provided with bearing indications, quadrant selecting means for consecutively placing the quadrantal sections of said chart into cooperative relation with said meter, and means for ascertaining the quadrant in which said wave is received comprising an omni-directional antenna, switching means for combining the energies received by said directional antennae and said omni-directional antenna to obtain a combined cardioid type receiving pattern and for indicating the amplitude of the combined energy, and further means for changing the relative polarity of the energies derived from said directional antennae upon passing from one to the next quadrantal position of said chart, whereby to displace the axis of said cardioid pattern to point in the direction of the quadrant selected.

7. A radio direction finding system comprising a pair of directional antennae having figure-of-eight receiving patterns and oriented with their axes forming right angles with each other, receiving means for said antennae comprising radio frequency amplifying and detecting means, a ratio meter energized by the output of said receiving means and adapted to indicate the ratio of the energies received by said directional antennae from an electromagnetic wave, said ratio bearing a definite relation to the direction of travel of said wave within a given quadrant, a circular dial chart having quadrantal sections each provided with indications, said indications forming a full circular 360° bearing scale upon said chart, quadrant selecting means for rotating said chart to consecutively place the quadrantal sections thereof into cooperative relation with said meter, means for ascertaining the quadrant in which said wave is received comprising an omni-directional antenna, switching means for combining the energies received by said directional antennae and said omni-directional antenna, whereby to obtain a combined cardioid type receiving pattern and for indicating the amplitude of the combined energy, and further means for changing the relative polarity of the energies derived from said directional antennae upon passing from one to the next quadrantal position of said chart, whereby to displace the axis of said cardioid pattern to point in the direction of the quadrant selected.

8. A radio direction finding system comprising a pair of directional antennae relatively oriented with their polar directional characteristics at least partly overlapping each other, common receiving means for said antennae comprising radio frequency amplifying means having an input circuit and an output circuit including a rectifier, a pair of current indicators arranged to afford an indication of the relative responses thereof by a single observation, first switching means comprising a pair of stationary contacts and a movable contact member adapted to alternately engage said stationary contacts, said stationary contacts being connected each to one end terminal of one of said antennae and said movable contact member being connected to both the opposite end terminals of said antennae in series with said input circuit, second switching means comprising a pair of stationary contacts and a movable contact member adapted to alternately engage said stationary contacts, output resistance means in series with said rectifier, circuit connections (a) between the electrical center point of said resistance means and one terminal of said output circuit (b) between each of the end terminals of said resistance means and one end terminal of one of said indicators (c) between each of the opposite end terminals of said indicators and one of said last-mentioned stationary contacts and (d) between said last-mentioned movable contact member and the other terminal of said output circuit, means for synchronously operating said movable contact members of said first and second switching means, and further means for temporarily simultaneously short-circuiting said stationary contacts of both said first and second switching means.

9. A radio direction finding system comprising a pair of directional antennae having substantially circular directional characteristics oriented at a 90° angle with respect to each other, common receiving means for said antennae comprising radio frequency amplifying means having an input circuit and an output circuit including a rectifier, a pair of current indicators arranged with their pointers cooperating over a common calibrated dial to afford a direct ratio indication of the responses thereof, first switching means comprising a pair of stationary contacts and a movable contact member adapted to alternately engage said stationary contacts, said stationary contacts being connected each to one end terminal of one of said antennae and said movable contact member being connected to both the opposite end terminals of said antennae in series with said input circuit, second switching means comprising a pair of stationary contacts and a movable contact member adapted to alternately engage said stationary contacts, output resistance means in series with said rectifier, circuit connection (a) between the electrical center point of said resistance means and one terminal of said output circuit (b) between each of the end terminals of said resistance means and one end terminal of one of said indicators (c) between each of the opposite end terminals of said indicators and one of said last-mentioned stationary contacts and (d) between said last-mentioned movable contact member and the other terminal of said output circuit, means for synchronously operating said movable contact members of said first and second switching means, and further means for temporarily simultaneously short-circuiting the stationary contact of both said first and second switching means.

10. A radio direction-finding system comprising a pair of loop antennae relatively fixedly oriented at a 90° angle, common receiving means for said antennae including radio frequency amplifier means and having an input circuit and an output circuit including a rectifier, a pair of current indicators arranged with their pointers cooperating over a common calibrated dial to afford a direct ratio indication of the responses thereof, first switching means comprising a pair of stationary contacts and a movable contact member adapted to alternately engage said stationary contacts, said stationary contacts being connected each to one end terminal of one of said antennae and said movable contact member being connected to both the opposite end terminals of said antennae in series with said input circuit, second switching means comprising a pair of stationary contacts and a movable contact member adapted to alternately engage said stationary contacts, output resistance means in series with said rectifier, circuit connections (a) between the electrical center point of said resistance means and one terminal of said output circuit (b) between each of the end terminals of said resistance means and one end terminal of one of said indicators (c) between each of the opposite end terminals of said indicators and one of said last-mentioned stationary contacts and (d) between said last-mentioned movable contact member and the other terminal of said output circuit, means for synchronously operating said movable contact members of said first and second switching means, and further means for temporarily simultaneously short-circuiting the stationary contacts of both said first and second switching means.

11. A radio direction-finding system comprising a pair of directional antennae relatively oriented with their polar directional characteristics overlapping each other, common receiving means for said antennae comprising radio frequency amplifying means having an input circuit and output circuit including a rectifier, a pair of current indicators arranged to afford a direct indication of the ratio of the responses thereof by a single observation, a first switching arrangement comprising a pair of contact elements and switching means adapted to alternatively establish conductive connection therebetween and said contact elements, said contact elements being connected each to one end terminal of one of said antennae and said switching means being connected to both the opposite end terminals of said antennae in series with said input circuit, a second switching arrangement comprising a pair of contact elements and switching means adapted to alternately establish conductive connection therebetween and said contact elements, output resistance means connected in series with said rectifier, circuit connections (a) between the electrical center point and said resistance means and one terminal of said output circuit (b) between each of the end terminals of said resistance means and one end terminal of one of said indicators (c) between each of the opposite end terminals of said indicators and one of said last mentioned contact elements and (d) between said last mentioned switching means and the other terminal of said output circuit, means for synchronously operating said switching means of said first and second switching arrangement, and further means for temporarily simultaneously short circuiting the contact elements of both said first and said second switching arrangements.

FREDERICK A. KOLSTER.

REFERENCES CITED

The following references are of record in the file of this patent:

UNITED STATES PATENTS

| Number | Name | Date |
| --- | --- | --- |
| 2,007,477 | Nickel | July 9, 1935 |
| 2,170,835 | Simon | Aug. 29, 1939 |
| 2,192,581 | Shulz | Mar. 5, 1940 |
| 2,204,206 | Brunner | June 11, 1940 |

FOREIGN PATENTS

| Number | Country | Date |
| --- | --- | --- |
| 460,271 | Germany | May 21, 1928 |
| 199,434 | Great Britain | June 13, 1923 |
| 501,550 | Great Britain | Mar. 1, 1939 |

OTHER REFERENCES

Ser. No. 440,416, Ahier (A. P. C.) pub. June 8, 1943.